US009407395B2

(12) United States Patent
Effenberger et al.

(10) Patent No.: US 9,407,395 B2
(45) Date of Patent: Aug. 2, 2016

(54) OPTICAL NETWORK UNIT (ONU) WAVELENGTH SELF-TUNING

(71) Applicant: Futurewei Technologies, Inc., Plano, TX (US)

(72) Inventors: Frank J. Effenberger, Colts Neck, NJ (US); Huafeng Lin, Santa Clara, CA (US); Lei Zong, Ellicott City, MD (US); Feng Wang, Jamestown, NC (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/323,641

(22) Filed: Jul. 3, 2014

(65) Prior Publication Data

US 2015/0010305 A1 Jan. 8, 2015

Related U.S. Application Data

(60) Provisional application No. 61/843,140, filed on Jul. 5, 2013.

(51) Int. Cl.
*H04B 10/00* (2013.01)
*H04J 14/02* (2006.01)
(Continued)

(52) U.S. Cl.
CPC .......... *H04J 14/0249* (2013.01); *H04B 10/572* (2013.01); *H04J 14/0282* (2013.01); *H04Q 2011/0022* (2013.01)

(58) Field of Classification Search
USPC .................................................. 398/182–201
See application file for complete search history.

(56) References Cited

U.S. PATENT DOCUMENTS

| | | | | |
|---|---|---|---|---|
| 4,912,526 A | * | 3/1990 | Iwaoka | ..................... G02F 1/11 398/196 |
| 5,107,512 A | * | 4/1992 | Shibutani | .............. H01S 5/0687 372/105 |
| 5,506,716 A | * | 4/1996 | Mihara | .............. H04B 10/1125 398/136 |

(Continued)

FOREIGN PATENT DOCUMENTS

WO 2012034604 A1 3/2012

OTHER PUBLICATIONS

Foreign Communication From a Counterpart Application, PCT Application No. PCT/US2014/045435, International Search Report dated Dec. 9, 2014, 6 pages.

(Continued)

*Primary Examiner* — Agustin Bello
(74) *Attorney, Agent, or Firm* — Conley Rose, P.C.; Grant Rodolph; Jonathan K. Polk

(57) ABSTRACT

A remote node (RN) comprises a downstream port, a wavelength multiplexer (WM) coupled to the downstream port and comprising ports for passing optical waves, an optical rotator coupled to the WM, and a mirror coupled to the optical rotator, wherein the WM, the optical rotator, and the mirror are part of a wavelength tuning scheme. An apparatus comprises a tunable transmitter, a polarization beam splitter (PBS) coupled to the tunable transmitter, a filter coupled to the PBS, a receiver coupled to the filter, a photodiode (PD) coupled to the PBS, and a processor coupled to the tunable transmitter and the PD. An apparatus comprises a tunable transmitter configured to transmit a first optical wave, a filter configured to receive a first reflected optical wave associated with the first optical wave, and a processor configured to tune the tunable transmitter based on the first reflected optical wave.

20 Claims, 8 Drawing Sheets

(51) Int. Cl.
*H04B 10/572* (2013.01)
*H04Q 11/00* (2006.01)

(56) References Cited

U.S. PATENT DOCUMENTS

| | | | | |
|---|---|---|---|---|
| 5,696,859 A * | 12/1997 | Onaka | ................ | G02B 6/12007 372/20 |
| 5,847,856 A * | 12/1998 | Imai | ................ | H04B 10/07955 359/333 |
| 5,943,152 A * | 8/1999 | Mizrahi | ................ | G02B 6/2932 372/34 |
| 6,043,883 A * | 3/2000 | Leckel | ................ | G01J 9/0246 356/454 |
| 6,101,014 A * | 8/2000 | Majima | ................ | H04J 14/0224 398/1 |
| 6,134,253 A * | 10/2000 | Munks | ................ | G02B 5/20 372/23 |
| 6,243,403 B1 * | 6/2001 | Broutin | ................ | H01S 5/0687 250/205 |
| 6,272,157 B1 * | 8/2001 | Broutin | ................ | H01S 5/0687 372/101 |
| 6,291,813 B1 * | 9/2001 | Ackerman | ................ | H04B 10/506 250/214 R |
| 6,366,592 B1 * | 4/2002 | Flanders | ................ | H01S 5/141 372/18 |
| 6,519,068 B1 * | 2/2003 | Broutin | ................ | H04B 10/572 372/32 |
| 6,567,198 B1 | 5/2003 | Kang | | |
| 6,621,580 B2 * | 9/2003 | Myatt | ................ | G01J 9/0246 356/454 |
| 6,697,160 B2 * | 2/2004 | Tsuda | ................ | G01J 9/0246 356/453 |
| 6,859,284 B2 * | 2/2005 | Rella | ................ | G01J 9/0246 356/519 |
| 6,891,868 B2 * | 5/2005 | Verboom | ................ | H01S 5/0683 372/38.02 |
| 6,898,221 B2 * | 5/2005 | Berger | ................ | H04B 10/503 372/20 |
| 6,931,038 B2 * | 8/2005 | Mazed | ................ | H01S 5/0687 372/20 |
| 6,943,889 B2 * | 9/2005 | Modavis | ................ | G02B 6/29395 356/451 |
| 7,133,610 B1 * | 11/2006 | Shimura | ................ | H04B 10/50575 398/15 |
| 7,483,453 B2 * | 1/2009 | Diffily | ................ | H01S 5/06256 372/18 |
| 7,680,364 B2 * | 3/2010 | Nilsson | ................ | B82Y 20/00 372/20 |
| 8,116,636 B2 * | 2/2012 | Youn | ................ | H04L 9/0858 398/152 |
| 8,559,821 B2 * | 10/2013 | Wen | ................ | H01S 5/0687 398/182 |
| 2002/0164125 A1 * | 11/2002 | Berger | ................ | H04B 10/503 385/39 |
| 2003/0076568 A1 * | 4/2003 | Wu | ................ | H04B 10/504 398/197 |
| 2011/0129227 A1 * | 6/2011 | Wen | ................ | H04B 10/572 398/82 |
| 2011/0236017 A1 | 9/2011 | Ohlen | | |
| 2012/0141128 A1 | 6/2012 | Bai et al. | | |
| 2015/0010305 A1 * | 1/2015 | Effenberger | ................ | H04B 10/572 398/48 |
| 2015/0236791 A1 * | 8/2015 | Nordholt | ................ | H04B 10/501 398/184 |

OTHER PUBLICATIONS

Foreign Communication From a Counterpart Application, PCT Application No. PCT/US2014/045435, Written Opinion dated Dec. 9, 2014, 8 pages.

* cited by examiner

OPTICAL NETWORK UNIT (ONU) WAVELENGTH SELF-TUNING

CROSS-REFERENCE TO RELATED APPLICATIONS

This application claims priority to U.S. provisional patent application No. 61/843,140 filed Jul. 5, 2013 by Frank Effenberger, et al., and titled "Self-Calibration of Optical Networking Unit in Wavelength Division Multiplexed Passive Optical Networks," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over the last mile, which is the final portion of a telecommunications network that exchanges communication with customers. A PON is a point-to-multipoint (P2MP) network comprised of an optical line terminal (OLT) at a central office (CO), an optical distribution network (ODN), and optical network units (ONUs) at the customers' premises. PONs may also comprise remote nodes (RNs) located between the OLTs and the ONUs, for instance at the end of a road where multiple customers reside.

In recent years, time-division multiplexing (TDM) PONs such as gigabit PONs (GPONs) and Ethernet PONs (EPONs) have been deployed worldwide for multimedia applications. In TDM PONs, the total capacity is shared among multiple users using a time-division multiple access (TDMA) scheme, so the average bandwidth for each user may be limited to below 100 megabits per second (Mbps).

Wavelength-division multiplexing (WDM) PONs are considered a very promising solution for future broadband access services. WDM PONs can provide high-speed links with dedicated bandwidth up to 10 gigabits per second (Gb/s). By employing a wavelength-division multiple access (WDMA) scheme, each ONU in a WDM PON is served by a dedicated wavelength channel to communicate with the CO or the OLT.

Next-generation PONs may combine TDMA and WDMA to support higher capacity so that an increased number of users can be served by a single OLT with sufficient bandwidth per user. In such a time- and wavelength-division multiplexing (TWDM) PON, a WDM PON may be overlaid on top of a TDM PON. In other words, different wavelengths may be multiplexed together to share a single feeder fiber, and each wavelength may be shared by multiple users using TDMA.

SUMMARY

In one embodiment, the disclosure a remote node (RN) comprising a downstream port, a wavelength multiplexer (WM) coupled to the downstream port and comprising ports for passing optical waves, an optical rotator coupled to the WM, and a mirror coupled to the optical rotator, wherein the WM, the optical rotator, and the mirror are part of a wavelength tuning scheme.

In another embodiment, the disclosure includes an apparatus comprising a tunable transmitter, a polarization beam splitter (PBS) coupled to the tunable transmitter, a filter coupled to the PBS, a receiver coupled to the filter, a photodiode (PD) coupled to the PBS, and a processor coupled to the tunable transmitter and the PD.

In yet another embodiment, the disclosure includes an apparatus comprising a tunable transmitter configured to transmit a first optical wave, a filter configured to receive a first reflected optical wave associated with the first optical wave, and a processor configured to tune the tunable transmitter based on the first reflected optical wave.

In yet another embodiment, the disclosure includes a method comprising transmitting a first optical wave at a first wavelength, receiving a first reflected optical wave at the first wavelength and associated with the first optical wave, determining a first power associated with the first reflected optical wave, and tuning a transmitting wavelength based on the first power.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
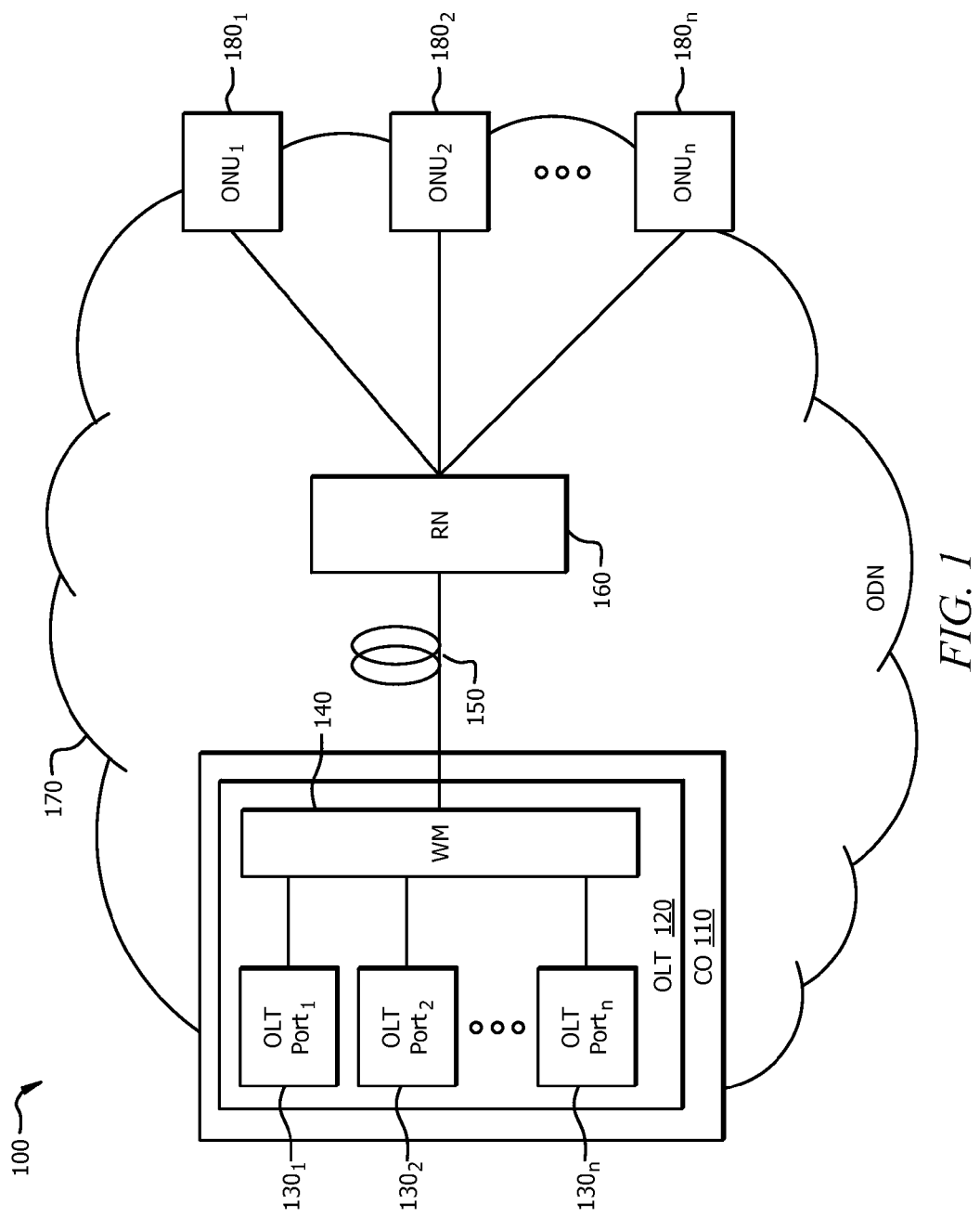
FIG. 1 is a schematic diagram of an embodiment of a PON.

FIG. 1 is a schematic diagram of an embodiment of a PON 100. The PON 100 may be suitable for implementing the disclosed embodiments. The PON 100 may comprise an OLT 120 located in a CO 110, $ONUs_{1-n}$ $180_{1-n}$ located at the customers' premises, and an ODN 170 that couples the OLT 120 to the $ONUs_{1-n}$ $180_{1-n}$. N may be any positive integer. The PON 100 may provide WDM capability by associating a downstream wavelength and an upstream wavelength with each OLT port$_{1-n}$ 130$_{1-n}$ so that a plurality of wavelengths is present, then combining those wavelengths into a single optical fiber cable 150 via a wavelength multiplexer/demultiplexer (WM) 140 and distributing the wavelengths to the ONUs$_{1-n}$ 180$_{1-n}$ through an RN 160. The PON 100 may provide TDM as well.

The PON 100 may be a communications network that does not require any active components to distribute data between the OLT 120 and the ONUs$_{1-n}$ 180$_{1-n}$. Instead, the PON 100 may use passive optical components in the ODN 170 to distribute data between the OLT 120 and the ONUs$_{1-n}$ 180$_{1-n}$. The PON 100 may adhere to any standard related to multiple-wavelength PONs.

The CO 110 may be a physical building and may comprise servers and other backbone equipment designed to service a geographical area with data transfer capability. The CO 110 may comprise the OLT 120, as well as additional OLTs. If additional OLTs are present, then any suitable access scheme may be used among them.

The OLT 120 may comprise the OLT ports$_{1-n}$ 130$_{1-n}$ and the WM 140. The OLT 120 may be any device suitable for communicating with the ONUs$_{1-n}$ 180$_{1-n}$ and another network. Specifically, the OLT 120 may act as an intermediary between the other network and the ONUs$_{1-n}$ 180$_{1-n}$. For instance, the OLT 120 may forward data received from the network to the ONUs$_{1-n}$ 180$_{1-n}$ and may forward data received from the ONUs$_{1-n}$ 180$_{1-n}$ to the other network. When the other network uses a network protocol that differs from the PON protocol used in the PON 100, the OLT 120 may comprise a converter that converts the network protocol to the PON protocol. The OLT 120 converter may also convert the PON protocol into the network protocol. Though the OLT 120 is shown as being located at the CO 110, the OLT 120 may be located at other locations as well.

The OLT ports$_{1-n}$ 130$_{1-n}$ may be any ports suitable for transmitting waves to and receiving waves from the WM 140. For instance, the OLT ports$_{1-n}$ 130$_{1-n}$ may comprise laser transmitters to transmit waves and photodiodes to receive waves, or the OLT ports$_{1-n}$ 130$_{1-n}$ may be connected to such transmitters and photodiodes. The OLT ports$_{1-n}$ 130$_{1-n}$ may transmit and receives waves in any suitable wavelength bands.

The WM 140 may be any suitable wavelength multiplexer/demultiplexer such as an arrayed waveguide grating (AWG). The WM 140 may multiplex the waves received from the OLT ports$_{1-n}$ 130$_{1-n}$, then forward the combined waves to the RN 160 via the optical fiber cable 150. The WM 140 may also demultiplex the waves received from the RN 160 via the optical fiber cable 150.

The RN 160 may be any component positioned within the ODN 170 that provides partial reflectivity, polarization rotation, and WDM capability. For example, the RN 160 may comprise a WM similar to the WM 140. The RN 160 may exist closer to the ONUs$_{1-n}$ 180$_{1-n}$ than to the CO 110, for instance at the end of a road where multiple customers reside, but the RN 160 may also exist at any suitable point in the ODN 170 between the ONUs$_{1-n}$ 180$_{1-n}$ and the CO 110.

The ODN 170 may be any suitable data distribution network, which may comprise optical fiber cables such as the optical fiber cable 150, couplers, splitters, distributors, or other equipment. The optical fiber cables, couplers, splitters, distributors, or other equipment may be passive optical components and therefore not require any power to distribute data signals between the OLT 120 and the ONUs$_{1-n}$ 180$_{1-n}$. Alternatively, the ODN 170 may comprise one or more active components such as optical amplifiers or a splitter. The ODN 170 may typically extend from the OLT 120 to the ONUs$_{1-n}$ 180$_{1-n}$ in a branching configuration as shown, but the ODN 170 may be configured in any suitable P2MP configuration.

The ONUs$_{1-n}$ 180$_{1-n}$ may comprise laser transmitters to transmit waves and photodiodes to receive waves. The ONUs$_{1-n}$ 180$_{1-n}$ may be any devices suitable for communicating with the OLT 120 and customers. Specifically, the ONUs$_{1-n}$ 180$_{1-n}$ may act as intermediaries between the OLT 120 and the customers. For instance, the ONUs$_{1-n}$ 180$_{1-n}$ may forward data received from the OLT 120 to the customers and forward data received from the customers to the OLT 120. The ONUs$_{1-n}$ 180$_{1-n}$ may be similar to optical network terminals (ONTs), so the terms may be used interchangeably. The ONUs$_{1-n}$ 180$_{1-n}$ may typically be located at distributed locations such as the customer premises, but may be located at other suitable locations as well.

WDM PONs are promising because they may expand PON capacity by tens to hundreds of wavelengths, improve a link budget by reducing a splitting loss in the RN, and simplify media access control (MAC) layer control and maintenance. In a WDM PON, a pair of waves, one downstream wave and one upstream wave, may be associated with each OLT port$_{1-n}$ 130$_{1-n}$ and corresponding ONU$_{1-n}$ 180$_{1-n}$. In a downstream direction, meaning from the OLT ports$_{1-n}$ 130$_{1-n}$ to the ONUs$_{1-n}$ 180$_{1-n}$, the downstream waves from the OLT ports$_{1-n}$ 130$_{1-n}$ may combine in the WM 140, propagate along the optical fiber cable 150, demultiplex in the RN 160, and propagate to their respective ONUs$_{1-n}$ 180$_{1-n}$. In an upstream direction, meaning from the ONUs$_{1-n}$ 180$_{1-n}$ to the OLT ports$_{1-n}$ 130$_{1-n}$, the upstream waves from the ONUs$_{1-n}$ 180$_{1-n}$ may combine in the RN 160, propagate along the optical fiber cable 150, demultiplex in the WM 140, and propagate to their respective OLT ports$_{1-n}$ 130$_{1-n}$. A typical WDM PON may use an AWG located in the RN 160 to demultiplex, multiplex, and route waves. The AWG may have individual ports, which may be arbitrarily assigned when a worker physically connects a fiber from each ONU$_{1-n}$ 180$_{1-n}$ to a single AWG port. For that reason, the ONUs$_{1-n}$ 180$_{1-n}$ may not know which AWG port they are connected to. Without knowing which AWG port they are connected to, the ONUs$_{1-n}$ 180$_{1-n}$ may not know which wavelength their AWG port may pass and thus at which wavelength the ONUs$_{1-n}$ 180$_{1-n}$ need to transmit.

The ONUs$_{1-n}$ 180$_{1-n}$ may be colorless, meaning that they may transmit or receive waves at any wavelength. Colorless ONUs$_{1-n}$ 180$_{1-n}$ are frequently used because they offer flexible network installation, maintenance, and operation. The transmitter of a colorless ONU$_{1-n}$ 180$_{1-n}$ may be a colorless laser, which may be fitted to the wavelength of any AWG port to which the ONU$_{1-n}$ 180$_{1-n}$ is connected. A tunable laser is one type of colorless laser. For a WDM PON employing tunable lasers, it is generally desirable to tune the tunable lasers so that they transmit waves at the wavelengths associated with their corresponding AWG ports. If a tunable laser does not transmit waves at the associated wavelength, the waves may not reach the OLT because the AWG may reject the waves or the waves may suffer from high insertion loss or group delay ripples.

U.S. Pat. No. 6,567,198 titled "Wavelength Stabilizer in WDM Optical Transmission System" to Yong-Hoon Kang, which is incorporated by reference, describes setting and stabilizing a laser wavelength locally in the ONU by monitoring and adjusting the laser temperature. United States Patent Application Publication number 2011/0236017 titled "Methods and Devices for Wavelength Alignment in WDM-PON" to Peter Ohlen, which is incorporated by reference, describes setting and stabilizing a laser wavelength based on a pre-measured data table and on a received wave power monitored at the OLT. Those solutions, however, may not be accurate because they may not consider wavelength drift due to laser aging. In addition, those solutions may require OLT involvement, which may make the wavelength tuning process slow and inefficient. Furthermore, merely monitoring a laser wavelength and adjusting it to reach a specific value does not guarantee that the ONU's upstream waves will pass through the AWG port because the ONU may not know what wavelength its associated AWG port will pass.

Disclosed herein are embodiments for ONU self-tuning, or self-calibration, that may not require OLT involvement. The embodiments may provide for an ONU sending an upstream wave, an RN reflecting a portion of the wave, and the ONU receiving the reflected wave for local monitoring. A reflector in the RN may reflect the upstream wave. A PBS in the ONU may separate the upstream wave and the reflected wave at a low insertion loss. An AWG may be located in the RN. When the upstream wave aligns with the associated wavelength of the AWG port, the ONU may detect a significant power increase in the reflected wave. The ONU may continue fine-tuning its laser by maximizing the reflected wave power, and the ONU may continue that process during normal operation in order to lock its wavelength.

As discussed above, a reflector may be placed in the RN 160. The reflector may be placed between an AWG and the optical fiber cable 150 to allow a portion of the upstream wave to proceed to the OLT 120 and a portion of the upstream wave to reflect back to the AWG. The AWG may demultiplex the reflected wave and any other downstream waves, then direct those waves to their corresponding ONUs$_{1-n}$ 180$_{1-n}$. Embodiments of the RN 160 are described more fully below.

Figure 2:
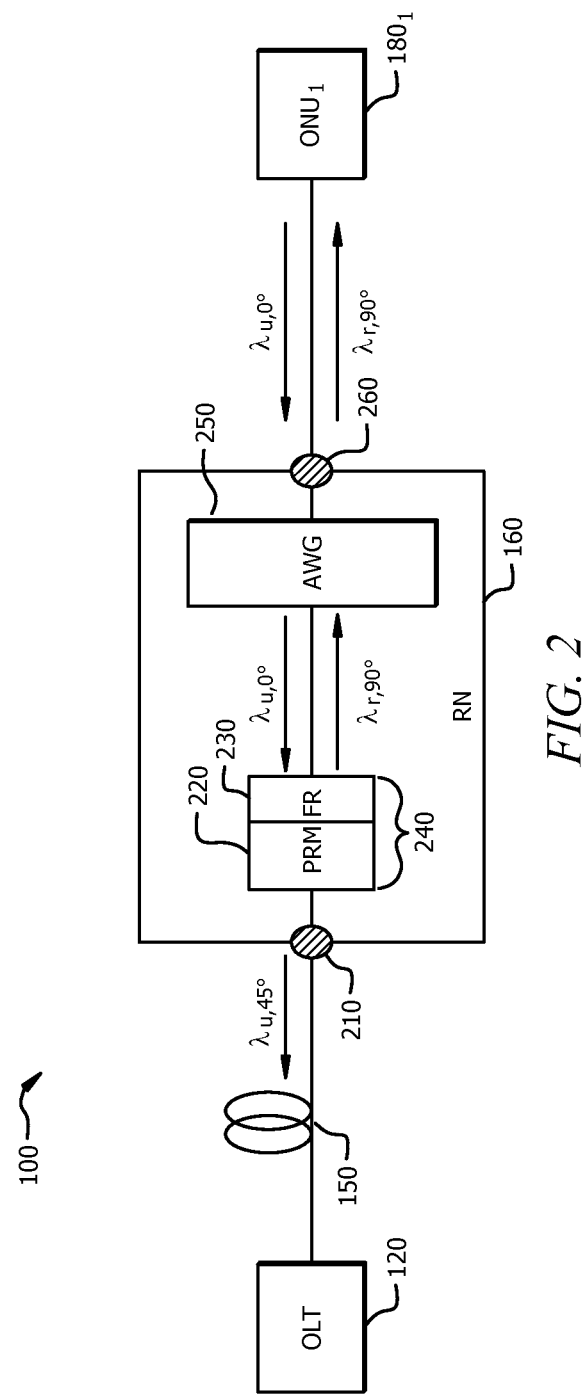
FIG. 2 is a schematic diagram of a portion of the PON in FIG. 1 according to an embodiment of the disclosure.

FIG. 2 is a schematic diagram of a portion of the PON 100 in FIG. 1 according to an embodiment of the disclosure. FIG. 2 may focus on the OLT 120, the optical fiber cable 150, the RN 160, and the ONU$_1$ 180$_1$, but specifically the RN 160, in FIG. 1. The RN 160 may comprise an upstream port 210, a partial-reflection mirror (PRM) 220, a 45 degree (°) Faraday rotator (FR) 230, an AWG 250, and a downstream port 260. The FR 230 may be any suitable optical polarization rotator. The PRM 220 may provide about 30% to 80% reflection or any other suitable amount of reflection. Together, the PRM 220 and the FR 230 may form a Faraday rotator mirror (FRM) 240. The AWG 250 may be any suitable WM suitable for multiplexing and demultiplexing waves at different wavelengths. Though the downstream port 260 is shown for the ONU$_1$ 180$_1$ is shown, the RN 160 may also comprise additional downstream ports for the other ONUs$_{2-n}$ 180$_{2-n}$. The components may be arranged as shown or in any other suitable manner.

As shown, the ONU$_1$ 180$_1$ may transmit an upstream wave, $\lambda_{u,0°}$, which may initially have a 0° polarization. $\lambda_{u,0°}$ may travel from the ONU$_1$ 180$_1$, though the downstream port 260, and to the AWG 250, and $\lambda_{u,0°}$ may be multiplexed with other upstream waves from the other ONUs$_{2-n}$ 180$_{2-n}$. $\lambda_{u,0°}$ may then travel through the FR 230 and experience a 45° polarization rotation to become $\lambda_{u,45°}$. The PRM 220 may allow a portion of $\lambda_{u,45°}$ to proceed through the upstream port 210 and the optical fiber cable 150 to the OLT 120. The PRM 220 may also reflect a portion of $\lambda_{u,45°}$ back to the FR 230 to experience another 45° polarization rotation to become $\lambda_{r,90°}$. $\lambda_{r,90°}$ may proceed back to the ONU$_1$ 180$_1$. The polarization state of $\lambda_{r,90°}$, which is 90°, may be orthogonal, or perpendicular, to the polarization state of $\lambda_{u,0°}$, which is 0°.

Figure 3:
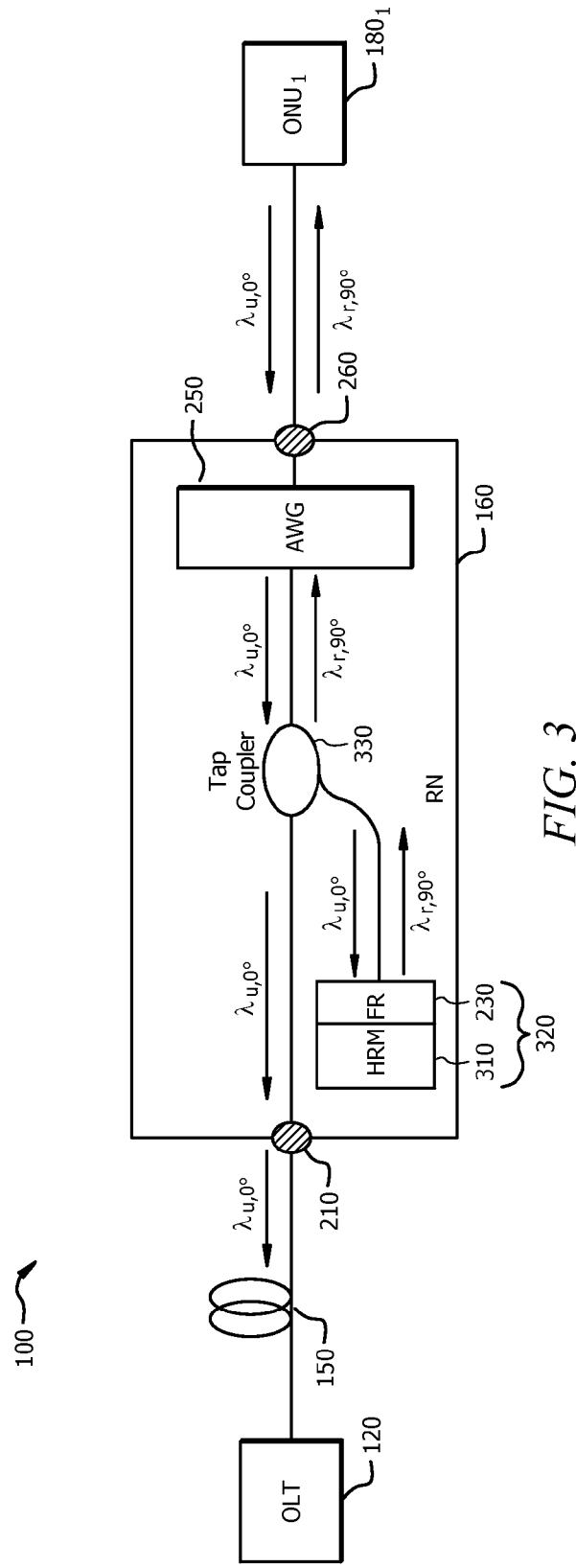
FIG. 3 is a schematic diagram of a portion of the PON in FIG. 1 according to another embodiment of the disclosure.

FIG. 3 is a schematic diagram of a portion of the PON 100 in FIG. 1 according to another embodiment of the disclosure. Like FIG. 2, FIG. 3 may focus on the OLT 120, the optical fiber cable 150, the RN 160, and the ONU$_1$ 180$_1$, but specifically the RN 160, in FIG. 1. The RN 160 may comprise the upstream port 210, a high-reflection mirror (HRM) 310, the FR 230, a tap coupler 330, the AWG 250, and the downstream port 260. Together, the HRM 310 and the FR 230 may form an FRM 320. The HRM 310 may provide about 90% to 100% reflection or any other suitable amount of reflection. The components may be arranged as shown or in any other suitable manner.

Unlike FIG. 2, FIG. 3 may comprise the tap coupler 330. The tap coupler 330 may be any optical coupler suitable for coupling downstream waves and splitting upstream waves. With the presence of the tap coupler 330, the AWG 250 and the FR 230 may be said to be indirectly coupled. Two components, for instance the AWG 250 and the FR 230, may be said to be indirectly coupled if at least one other component is positioned between them, for instance if the tap coupler 330 is positioned between them.

As shown, the ONU$_1$ 180$_1$ may transmit an upstream wave, $\lambda_{u,0°}$, which may initially have a 0° polarization. $\lambda_{u,0°}$ may travel from the ONU$_1$ 180$_1$, through the downstream port 260, and to the AWG 250, and $\lambda_{u,0°}$ may be multiplexed with other upstream waves from the other ONUs$_{2-n}$ 180$_{2-n}$. $\lambda_{u,0°}$ may then travel through the tap coupler 330. The tap coupler 330 may allow a portion of $\lambda_{u,0°}$ to proceed through the upstream port 210 and the optical fiber cable 150 to the OLT 120. In other words, $\lambda_{u,0°}$ may maintain its 0° polarization all the way from the ONU$_1$ 180$_1$ to the OLT 120. The tap coupler 330 may also allow a portion of $\lambda_{u,0°}$ to proceed to the FRM 320. That portion of $\lambda_{u,0°}$ may travel through the FR 230 and experience a 45° polarization rotation to become $\lambda_{u,45°}$. The HRM 310 may reflect all or nearly all of $\lambda_{u,45°}$ to experience another 45° polarization rotation to become $\lambda_{r,90°}$. $\lambda_{r,90°}$ may proceed back through the tap coupler 330 to the ONU$_1$ 180$_1$. The polarization state of $\lambda_{r,90°}$, which is 90°, may be orthogonal to the polarization state of $\lambda_{u,0°}$, which is 0°.

As described above, the reflection of $\lambda_u$ may occur in the RN 160. The components of the RN 160 necessary for that reflection may, however, be at other suitable locations in the PON 100. Furthermore, the behavior of $\lambda_u$ and $\lambda_r$ and embodiments of the ONUs$_{1-n}$ 180$_{1-n}$ are described with respect to the ONU$_1$ 180$_1$, but the same concepts also apply to the other ONUs$_{2-n}$ 180$_{2-n}$. Additionally, $\lambda_u$ is described as having a 0° or 45° polarization, and $\lambda_r$ is described as having a 90° polarization, but the respective polarizations may not be exactly 0°, 45°, or 90°. Rather, the polarizations may be at approximately those angles, at any angles that allow an orthogonal relation between $\lambda_u$ and $\lambda_r$, or at any angles that allow a separation between $\lambda_u$ and $\lambda_r$.

Figure 4:
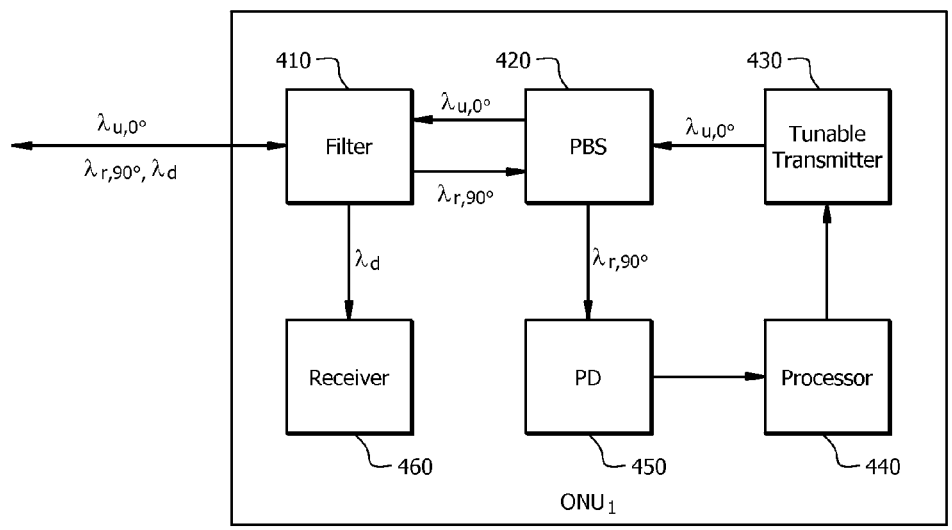
FIG. 4 is a schematic diagram of the $ONU_1$ in FIG. 1 according to an embodiment of the disclosure.

FIG. 4 is a schematic diagram of the ONU$_1$ 180$_1$ in FIG. 1 according to an embodiment of the disclosure. The ONU$_1$ 180$_1$ may comprise a filter 410, a polarization beam splitter (PBS) 420, a tunable transmitter 430, a processor 440, a PD 450, and a receiver 460. The components may be arranged as shown or in any other suitable manner. In general, the ONU$_1$ 180$_1$ may transmit upstream waves to the OLT 120, receive downstream waves from the OLT 120, and receive reflected waves from the RN 160. In particular, the ONU$_1$ 180$_1$ may transmit $\lambda_{u,0°}$, an upstream wave with a 0° polarization; receive $\lambda_d$, a downstream wave with an any polarization; and receive $\lambda_{r,90°}$, a reflected wave with a 90° polarization. $\lambda_{u,0°}$ and $\lambda_{r,90°}$ may be at roughly the same wavelength or may be intended to be at the same wavelength while $\lambda_d$ may be at a different wavelength.

The filter 410 may be a bandpass filter or any suitable filter that can separate downstream waves from upstream waves. The filter 410 may separate waves based on wavelength. In particular, the filter 410 may separate $\lambda_d$ on the one hand from $\lambda_{u,0°}$ and $\lambda_{r,90°}$ on the other hand. The filter 410 may be referred to as a band upstream/band downstream (Bu/Bd) filter.

The PBS 420 may be any suitable polarization beam splitter that can separate waves with similar wavelengths, but different polarization states. In particular, the PBS 420 may separate $\lambda_{u,0°}$ from $\lambda_{r,90°}$ because the two waves may have approximately a 90° difference in polarizations. In other words, the two waves may be orthogonal to each other. The PBS 420 may be used because the inputs and outputs of the $ONU_1$ $180_1$ may be on the same fiber. In other words, the $ONU_1$ $180_1$ may not be able to distinguish between its inputs and outputs without additional components. Instead of the PBS 420, the $ONU_1$ $180_1$ may use an optical coupler, optical circulator, or partial reflection mirror. However, optical couplers may have high insertion loss and may require an accompanying optical isolator in order to block coherent feedback from the tunable transmitter 430. Optical circulators may be relatively expensive to use. Partial reflection mirrors may discard part of the waves they are processing.

The tunable transmitter 430 may be any suitable tunable transmitter that is colorless, or can transmit waves at any wavelength. The tunable transmitter 430 may comprise a tunable laser. As shown, the tunable transmitter 430 may transmit $\lambda_{u,0°}$, an upstream wavelength with a 0° polarization state.

The processor 440 may be any suitable processor that can process signals received from the PD 450 and transmit instructions to the tunable transmitter 430. The processor 440 may perform any computational functions necessary to process those signals and transmit those instructions.

The PD 450 may be any suitable PD that can convert optical waves into electrical waves and monitor a received power. The PD 450 may be referred to as a monitoring PD because it may monitor a reflected power. Specifically, the PD 450 may monitor and determine a power associated with $\lambda_r$.

The receiver 460 may be any suitable receiver that can convert optical waves into electrical waves and provide those electrical waves in a usable form for a customer. Specifically, the receiver may receive $\lambda_d$, convert $\lambda_d$ into an electrical wave, and provide the electrical wave to the customer. The receiver 460 may comprise a PD for converting optical waves into electrical waves.

In the upstream direction, the tunable transmitter 430 may transmit $\lambda_{u,0°}$ to the PBS 420. The PBS 420 may distinguish $\lambda_{u,0°}$ from $\lambda_{r,90°}$ because the polarizations of the two waves may be orthogonal to each other. The PBS 420 may then forward $\lambda_{u,0°}$ to the filter 410. The filter 410 may distinguish $\lambda_{u,0°}$ and $\lambda_{r,90°}$ on the one hand from $\lambda_d$ on the other hand because the wavelength of $\lambda_{u,0°}$ and $\lambda_{r,90°}$ may be different from the wavelength of $\lambda_d$. The filter 410 may then forward $\lambda_{u,0°}$ to the RN 160 and eventually the OLT 120.

In the downstream direction, the filter 410 may receive $\lambda_{r,90°}$ and $\lambda_d$ from the RN 160. The filter 410 may distinguish $\lambda_{u,0°}$ and $\lambda_{r,90°}$ on the one hand from $\lambda_d$ on the other hand because the wavelength of $\lambda_{u,0°}$ and $\lambda_{r,90°}$ may be different from the wavelength of $\lambda_d$. The filter 410 may forward $\lambda_d$ to the receiver 460 for optical-to-electrical (OE) conversion and processing. The filter 410 may also forward $\lambda_{r,90°}$ to the PBS 420. The PBS 420 may distinguish $\lambda_{u,0°}$ from $\lambda_{r,90°}$ because the polarizations of the two waves may be orthogonal to each other. The PBS 420 may then forward $\lambda_{r,90°}$ to the PD 450 for OE conversion and power determination. The PD 450 may forward the converted wave to the processor 440 for processing.

Figure 5:
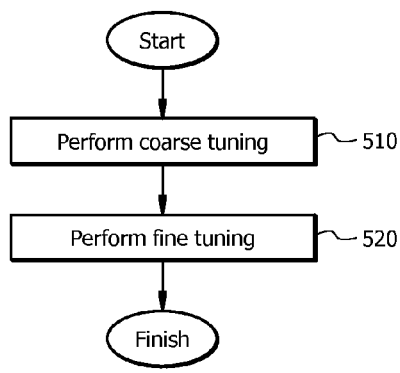
FIG. 5 is a flowchart illustrating a method of wavelength correction according to an embodiment of the disclosure.

FIG. 5 is a flowchart illustrating a method 500 of wavelength correction according to an embodiment of the disclosure. After the $ONU_1$ $180_1$ turns on or at any other suitable time, the $ONU_1$ $180_1$ may attempt to tune the tunable transmitter 430 so that the tunable transmitter 430 transmits $\lambda_u$ at the wavelength associated with the corresponding AWG 250 port. The method 500 may be implemented in the $ONU_1$ $180_1$.

At step 510, coarse tuning may be performed. During coarse tuning, the processor 440 may instruct the tunable transmitter 430 to adjust its transmitting wavelength across its entire tuning range at a large step size, for instance at about 0.25-0.5 of its channel spacing. Channel spacing may typically be about 20 nanometers (nm) for coarse WDM (CWDM) and about 12.5 gigahertz (GHz) for dense WDM (DWDM). When the tunable transmitter 430 tunes to a first threshold wavelength, the PD 450 may detect a power increment for $\lambda_r$ that is above a first threshold, $threshold_1$, that may be predefined based on design, testing, or other suitable means. The first threshold wavelength may roughly match the wavelength associated with the corresponding AWG 250 port, but not be in the center of the corresponding AWG 250 port passband, so $\lambda_u$ at the first threshold wavelength may still experience high insertion loss in the AWG 250.

At step 520, fine tuning may be performed. During fine tuning, the processor 440 may instruct the tunable transmitter 430 to adjust its transmitting wavelength across its entire tuning range at a small step size, for instance at about 0.1 of its channel spacing. When the tunable transmitter 430 tunes to a second threshold wavelength, the PD 450 may detect a power increment for $\lambda_r$ that is above a second threshold, $threshold_2$, that may be predefined based on design, testing, or other suitable means. The second threshold wavelength may nearly precisely match the wavelength associated with the corresponding AWG 250 port, so $\lambda_u$ at the second threshold wavelength may experience no or negligible insertion loss in the AWG 250. The $ONU_1$ $180_1$ may continuously perform step 520 during its normal operation in order to keep the power of $\lambda_r$ at or near its maximum and thus to keep $\lambda_u$ locked at the wavelength associated with the corresponding AWG 250 port.

Figure 6:
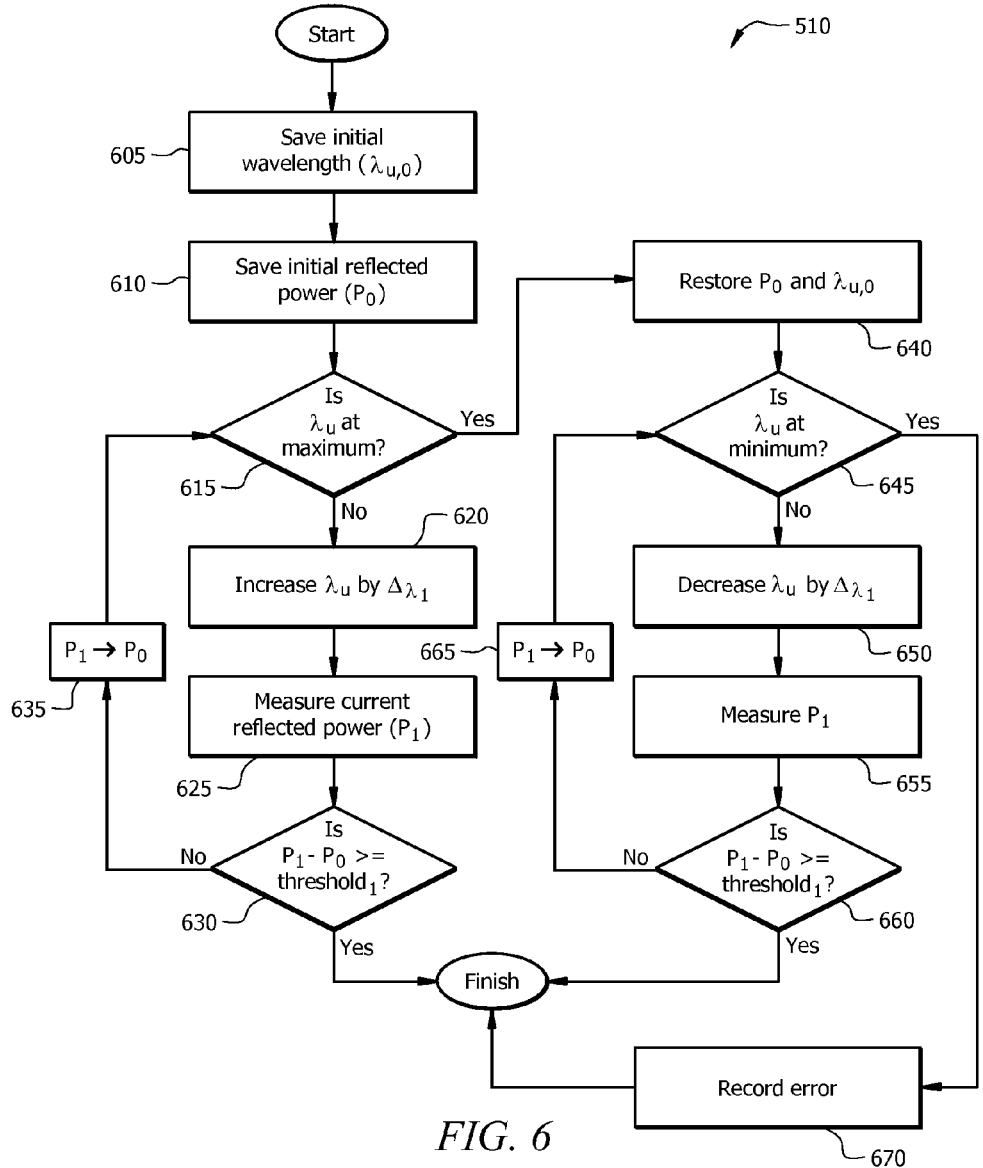
FIG. 6 is a flowchart illustrating the coarse tuning step of FIG. 5 according to an embodiment of the disclosure.

FIG. 6 is a flowchart illustrating the coarse tuning step 510 of FIG. 5 according to an embodiment of the disclosure. At step 605, $\lambda_{u,0}$, an initial upstream wavelength of the tunable transmitter 430, may be saved. The tunable transmitter 430 may then transmit $\lambda_u$ at $\lambda_{u,0}$, and the $ONU_1$ $180_1$ may receive $\lambda_r$. At step 610, $P_0$, an initial reflected power associated with $\lambda_r$, may be measured and saved. At decision diamond 615, it may be determined whether or not $\lambda_u$ is at a maximum wavelength, for instance the maximum wavelength that the tunable transmitter 430 may transmit at. If so, then the method may proceed to step 640. If not, then the method may proceed to step 620. At step 620, the wavelength of $\lambda_u$ may be incremented by $\Delta_{\lambda_1}$, a relatively large step size that may be about 0.25-0.5 of the channel spacing of the tunable transmitter 430. The tunable transmitter 430 may then transmit $\lambda_u$ at the incremented wavelength, and the $ONU_1$ $180_1$ may receive $\lambda_r$ at the incremented wavelength. At step 625, $P_1$, the current reflected power of $\lambda_r$ at the incremented wavelength, may be measured. At decision diamond 630, the quantity $P_1-P_0$ may be determined. If that quantity is greater than or equal to $threshold_1$, then the method may finish and proceed to step 520 of FIG. 5. If that quantity is less than $threshold_1$, then the method may proceed to step 635. At step 635, $P_1$ may become the new $P_0$. The method may repeat steps 615 to 630 until the quantity $P_1-P_0$ is greater than or equal to $threshold_1$.

At step 640, $\lambda_{u,0}$ and $P_0$ from steps 605 and 610, respectively, may be restored. At decision diamond 645, it may be determined whether or not $\lambda_u$ is at a minimum wavelength, for instance the minimum wavelength that the tunable transmitter 430 may transmit at. If $\lambda_u$ is at a minimum wavelength, then the method may proceed to step 670, where an error may be recorded and the method may finish and proceed to step 520 of FIG. 5. An error may be recorded because the wavelength of $\lambda_u$ may not be simultaneously at its maximum and minimum. If $\lambda_u$ is not at a minimum wavelength, then the method may proceed to step 650. At step 650, the wavelength of $\lambda_u$ may be decremented by $\Delta_{\lambda_1}$. The tunable transmitter 430 may then transmit $\lambda_u$ at the decremented wavelength, and the ONU$_1$ 180$_1$ may receive $\lambda_r$ at the decremented wavelength. At step 655, P$_1$, the current reflected power of $\lambda_r$ at the decremented wavelength, may be measured. At decision diamond 660, the quantity P$_1$-P$_0$ may be determined. If that quantity is greater than or equal to threshold$_1$, then the method may finish and proceed to step 520 of FIG. 5. If that quantity is less than threshold$_1$, then the method may proceed to step 665. At step 665, P$_1$ may become the new P$_0$. The method may repeat steps 645 to 660 until the quantity P$_1$-P$_0$ is greater than or equal to threshold$_1$.

Figure 7:
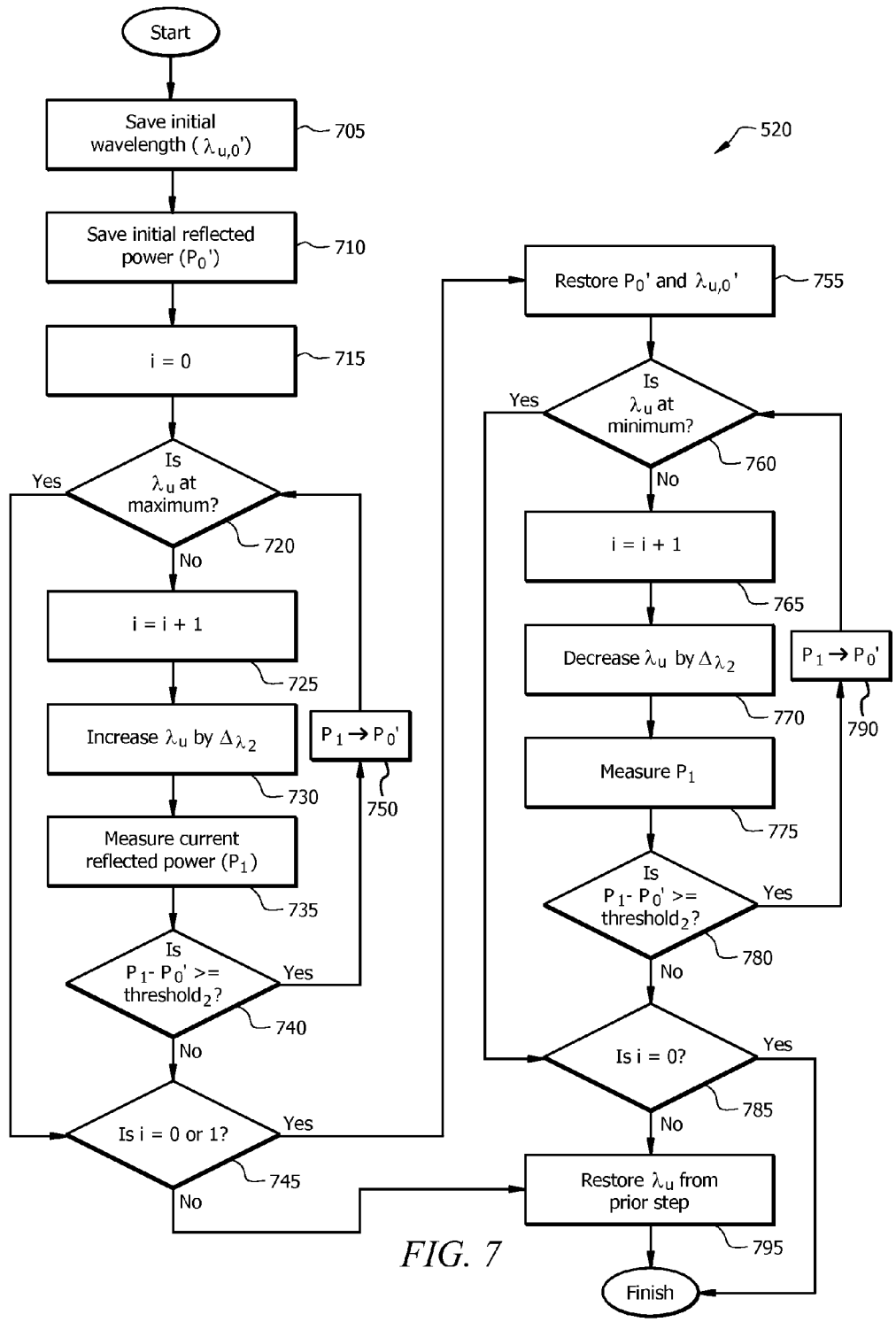
FIG. 7 is a flowchart illustrating the fine tuning step of FIG. 5 according to an embodiment of the disclosure.

FIG. 7 is a flowchart illustrating the fine tuning step 520 of FIG. 5 according to an embodiment of the disclosure. At step 705, $\lambda_{u,0}'$, an initial upstream wavelength of the tunable transmitter 430, may be saved. $\lambda_{u,0}'$ may be the last wavelength used in step 510 where P$_1$-P$_0$ was greater than or equal to threshold$_1$. At step 710, P$_0'$, an initial reflected power associated with $\lambda_r$, may be measured and saved. P$_0'$ may be the power associated with $\lambda_{u,0}'$ and measured at step 510. At step 715, i, a reiteration counter, may be initialized at 0. At decision diamond 720, it may be determined whether or not $\lambda_u$ is at a maximum wavelength, for instance the maximum wavelength that the tunable transmitter 430 may transmit at. If so, then the method may proceed to step 745. If not, then the method may proceed to step 725. At step 725, i may be incremented by 1. At step 730, the wavelength of $\lambda_u$ may be incremented by $\Delta_{\lambda_2}$, a relatively small step size that may be about 0.1 of the channel spacing of the tunable transmitter 430. The tunable transmitter 430 may then transmit $\lambda_u$ at the incremented wavelength, and the ONU$_1$ 180$_1$ may receive $\lambda_r$ at the incremented wavelength. At step 735, P$_1$, the current reflected power of $\lambda_r$ at the incremented wavelength, may be measured. At decision diamond 740, the quantity P$_1$-P$_0'$ may be determined. If the quantity P$_1$-P$_0'$ is greater than or equal to threshold$_2$, then the method may proceed to step 750. At step 750, P$_1$ may become the new P$_0'$, and the method may proceed to decision diamond 720. Returning to decision diamond 740, if the quantity P$_1$-P$_0'$ is less than threshold$_2$, then the method may proceed to decision diamond 745. At decision diamond 745, it may be determined whether or not i is equal to 0 or 1. If so, then the method may proceed to step 755. If not, then the method may proceed to step 795. At step 795, the wavelength of $\lambda_u$ may be restored to the wavelength from the prior iteration, and the method 500 may finish.

At step 755, $\lambda u_0'$ and P$_0'$ from steps 705 and 710, respectively, may be restored. At decision diamond 760, it may be determined whether or not $\lambda_u$ is at a minimum wavelength, for instance the minimum wavelength that the tunable transmitter 430 may transmit at. If $\lambda_u$ is at a minimum wavelength, then the method may proceed to decision diamond 785. At decision diamond 785, it may be determined whether or not i is equal to 0. If so, then the method 500 may finish. If not, then the method may proceed to step 795, which is described above. Returning to decision diamond 760, if $\lambda_u$ is not at a minimum wavelength, then the method may proceed to step 765. At step 765, i may be incremented by 1. At step 770, the wavelength of $\lambda_u$ may be decremented by $\Delta_{\lambda_2}$. The tunable transmitter 430 may then transmit $\lambda_u$ at the decremented wavelength, and the ONU$_1$ 180$_1$ may receive $\lambda_r$ at the decremented wavelength. At step 775, P$_1$, the current reflected power of $\lambda_r$ at the decremented wavelength, may be measured. At decision diamond 780, the quantity P$_1$-P$_0'$ may be determined. If the quantity P$_1$-P$_0'$ is greater than or equal to threshold$_2$, then the method may proceed to step 790. At step 790, P$_1$ may become the new P$_0'$, and the method may proceed to decision diamond 760. Returning to decision diamond 780, if the quantity P$_1$-P$_0'$ is less than threshold$_2$, then the method may proceed to decision diamond 785, which is described above.

Figure 8:
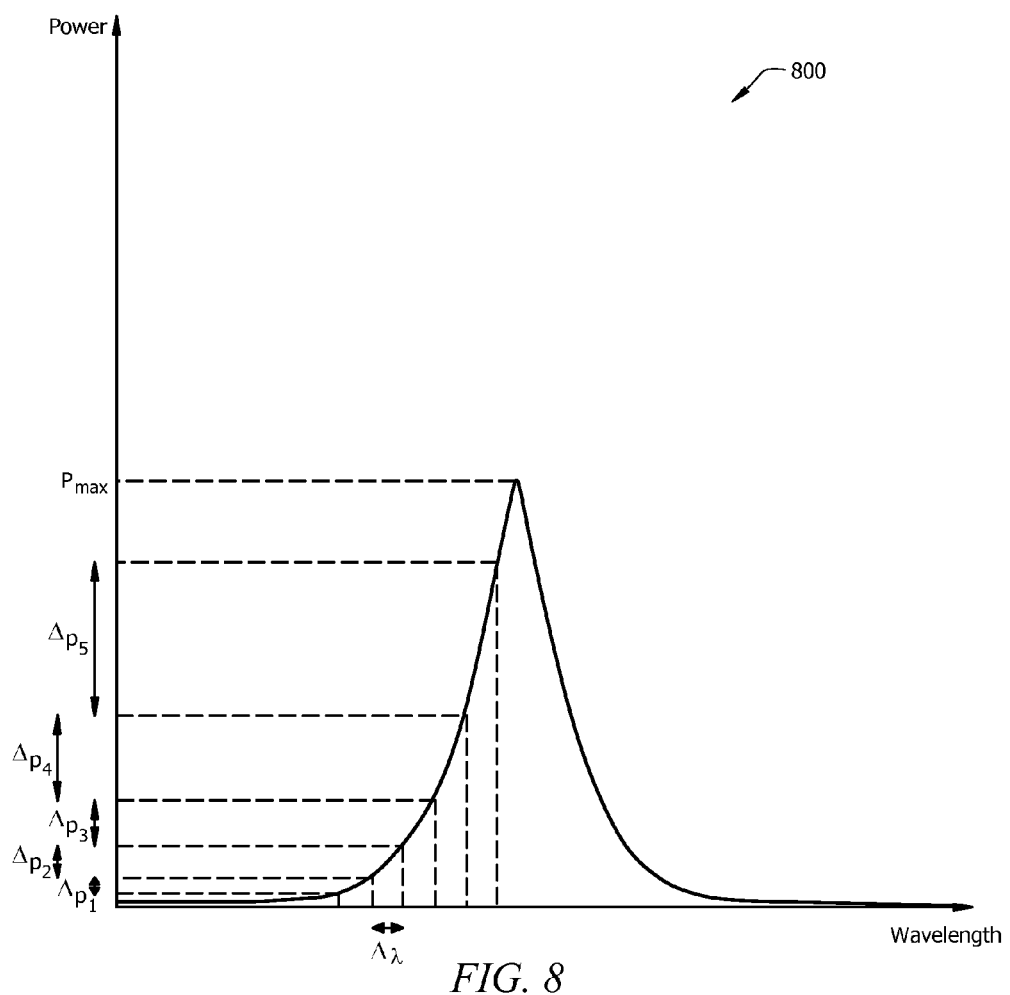
FIG. 8 is a graph of wavelength versus power for the $ONU_1$ in FIG. 1 according to an embodiment of the disclosure.

FIG. 8 is a graph 800 of wavelength versus power for the ONU$_1$ 180$_1$ in FIG. 1 according to an embodiment of the disclosure. As shown, the x-axis represents wavelength as constants or arbitrary units, and the y-axis represents power as constants or arbitrary units. Specifically, the x-axis may represent the wavelength of $\lambda_u$, and thus $\lambda_r$, and the y-axis may represent the power of $\lambda_r$. As can be seen, the power spectrum of $\lambda_r$ may be relatively flat, except for a relatively sharp spectrum peak centered around P$_{max}$, the point where the power is a maximum. Such a spectrum may be typical for waves passing through an AWG port. As can also be seen, $\Delta_{P_1} < \Delta_{P_2} < \Delta_{P_3} < \Delta_{P_4} < \Delta_{P_5}$, which may indicate that the power at wavelengths equally spaced by $\Delta_\lambda$ may increase more significantly as the wavelength approaches the point where P$_{max}$ is reached. As a result, $\Delta_{P_5}$ may be greater than a predefined threshold, for instance threshold$_1$ or threshold$_2$, thus demonstrating the general strategy of steps 510 and 520 for determining the wavelength associated with the corresponding AWG 250 port.

While the graph 800 may demonstrate the general strategy of steps 510 and 520, other methods may also determine the wavelength associated with the corresponding AWG 250 port. For example, the ONU$_1$ 180$_1$ may simply transmit $\lambda_u$ at its known minimum wavelength and measure the power of $\lambda_r$, then increase the wavelength of $\lambda_u$ by some predefined increment and measure the power of $\lambda_r$ until the ONU$_1$ 180$_1$ transmits $\lambda_u$ at its known maximum wavelength. The ONU$_1$ 180$_1$ may then determine which wavelength is associated with a maximum power of $\lambda_r$, then continue transmitting $\lambda_u$ at that wavelength. Alternatively, the ONU$_1$ 180$_1$ may simply transmit $\lambda_u$ at its known maximum wavelength and measure the power of $\lambda_r$, then decrease the wavelength of $\lambda_u$ by some predefined increment and measure the power of $\lambda_r$ until the ONU$_1$ 180$_1$ transmits $\lambda_u$ at its known minimum wavelength. The ONU$_1$ 180$_1$ may then determine which wavelength is associated with a maximum power of $\lambda_r$, then continue transmitting $\lambda_u$ at that wavelength. Alternatively, the ONU$_1$ 180$_1$ may employ those methods, but provide different wavelength increments, for instance coarse wavelength increments followed by fine wavelength increments. While those methods may be simpler, they may also be less efficient. Nonetheless, those methods or any suitable method for determining the wavelength associated with the corresponding AWG 250 port may be used.

Figure 9:
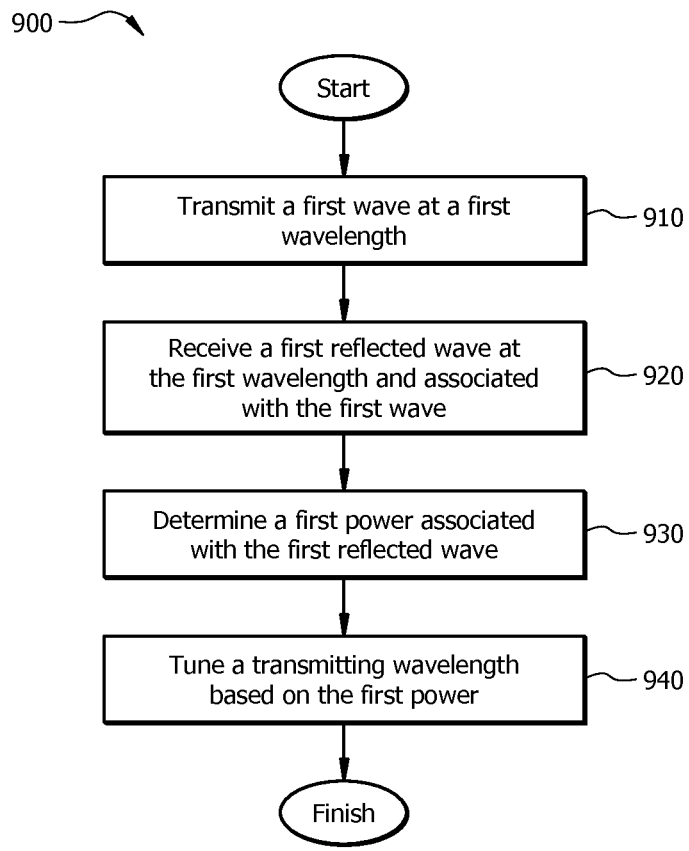
FIG. 9 is a flowchart illustrating a method of wavelength tuning according to an embodiment of the disclosure.

FIG. 9 is a flowchart illustrating a method 900 of wavelength tuning according to an embodiment of the disclosure. The method 900 may be implemented in the ONUs$_{1-n}$ 180$_{1-n}$, for instance the ONU$_1$ 180$_1$. At step 910, a first wave at a first wavelength may be transmitted. For instance, the tunable transmitter 430 may transmit $\lambda_u$. At step 920, a first reflected wave at the first wavelength may be received. For instance, the filter 410 may receive $\lambda_r$. The first reflected wave may be associated with the first wave. For instance $\lambda_r$ may be the portion of $\lambda_u$ reflected at the RN 160. At step 930, a first power associated with the first reflected wave may be determined. For instance, the PD 450 may determine P, the power of $\lambda_r$. At step 940, a transmitting wavelength may be tuned based on the first power. For instance, the processor 440 may tune a wavelength of the tunable transmitter 430 based on P.

Figure 10:
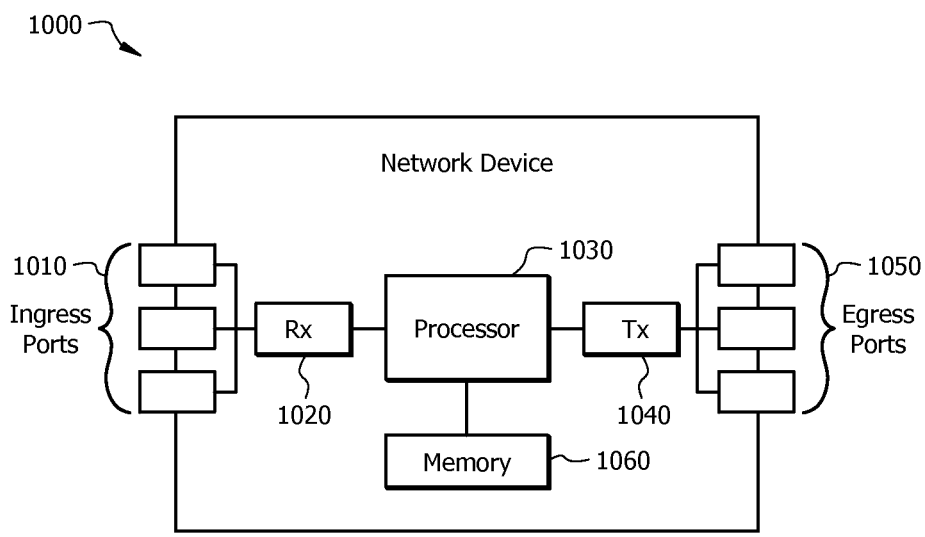
FIG. 10 is a schematic diagram of an embodiment of a network device.

FIG. 10 is a schematic diagram of an embodiment of a network device 1000. The network device 1000 may be suitable for implementing the disclosed embodiments, for instance the OLT 120, the RN 160, and the ONUs$_{1-n}$ 180$_{1-n}$. The network device 1000 may comprise ingress ports 1010 and receiver units (Rx) 1020 for receiving data; a processor, logic unit, or central processing unit (CPU) 1030 to process the data; transmitter units (Tx) 1040 and egress ports 1050 for transmitting the data; and a memory 1060 for storing the data. The network device 1000 may also comprise OE components and electrical-to-optical (EO) components coupled to the ingress ports 1010, receiver units 1020, transmitter units 1040, and egress ports 1050 for egress or ingress of optical or electrical signals.

The processor 1030 may be implemented by hardware and software. The processor 1030 may be implemented as one or more CPU chips, cores (e.g., as a multi-core processor), field-programmable gate arrays (FPGAs), application specific integrated circuits (ASICs), and digital signal processors (DSPs). The processor 1030 may be in communication with the ingress ports 1010, receiver units 1020, transmitter units 1040, egress ports 1050, and memory 1060.

The memory 1060 may comprise one or more disks, tape drives, and solid-state drives; may be used as an over-flow data storage device; may be used to store programs when such programs are selected for execution; and may be used to store instructions and data that are read during program execution. The memory 1060 may be volatile and non-volatile and may be read-only memory (ROM), random-access memory (RAM), ternary content-addressable memory (TCAM), and static random-access memory (SRAM).

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   a tunable transmitter;
   a polarization beam splitter (PBS) coupled to the tunable transmitter;
   a filter coupled to the PBS in a bidirectional manner;
   a receiver coupled to the filter;
   a photodiode (PD) coupled to the PBS; and
   a processor coupled to the tunable transmitter and the PD.

2. The apparatus of claim 1, wherein the apparatus is an optical network unit (ONU), and wherein the tunable transmitter is a colorless laser.

3. An apparatus comprising:
   a tunable transmitter configured to transmit, towards a reflector located outside the apparatus, a first optical wave;
   a filter configured to receive, from the reflector, a first reflected optical wave associated with the first optical wave; and
   a processor configured to tune the tunable transmitter based on the first reflected optical wave.

4. The apparatus of claim 3, further comprising a photodiode (PD) configured to determine a first power associated with the first reflected optical wave, wherein the processor is configured to tune the tunable transmitter based on the first power.

5. The apparatus of claim 3, wherein the tunable transmitter is further configured to transmit a second optical wave, wherein the filter is further configured to receive a second reflected optical wave associated with the second optical wave, and wherein the processor is further configured to tune the tunable transmitter based on a second power associated with the second reflected optical wave.

6. The apparatus of claim 5, wherein the processor is further configured to tune the tunable transmitter based on a comparison between the first power and the second power.

7. The apparatus of claim 3, wherein the apparatus is an optical network unit (ONU).

8. A method implemented in an optical network unit (ONU), the method comprising:
   transmitting, towards a reflector located outside the ONU, a first optical wave at a first wavelength;
   receiving, from the reflector, a first reflected optical wave at the first wavelength and associated with the first optical wave;
   determining a first power associated with the first reflected optical wave; and
   tuning a transmitting wavelength based on the first power.

9. The method of claim 8, wherein the tuning comprises coarse tuning and fine tuning.

10. The method of claim 9, wherein the coarse tuning comprises:
    transmitting a second optical wave at a second wavelength, wherein the second wavelength is a first increment higher or lower than the first wavelength;
    receiving a second reflected optical wave at the second wavelength and associated with the second optical wave;
    determining a second power associated with the second reflected optical wave; and
    tuning the transmitting wavelength based on a difference between the first power and the second power.

11. The method of claim 10, wherein the fine tuning comprises:
    transmitting a third optical wave at a third wavelength, wherein the third wavelength is a second increment higher or lower than the second wavelength;
    receiving a third reflected optical wave at the third wavelength and associated with the third optical wave;
    determining a third power associated with the third reflected optical wave; and
    tuning the transmitting wavelength based on a difference between the second power and the third power.

12. The method of claim 11, wherein the first increment is larger than the second increment.

13. The method of claim 12, wherein the first increment is 0.25 to 0.5 of a channel spacing and the second increment is 0.1 of the channel spacing.

14. The apparatus of claim 1, wherein the filter is directly coupled to the PBS, the PD is directly coupled to the PBS, and the processor is directly coupled to the PD.

15. The apparatus of claim 1, wherein there are no components between the filter and the PBS, between the PD and the PBS, or between the processor and the PD.

16. The apparatus of claim 1, wherein the filter is configured to separate downstream waves from upstream waves.

17. The apparatus of claim 1, wherein the receiver is configured to:
    convert optical waves into electrical waves; and
    provide the electrical waves in a usable form for a customer.

18. The apparatus of claim 3, wherein the tunable transmitter is further configured to transmit the first optical wave with a first polarization.

19. The apparatus of claim 18, wherein the filter is further configured to receive the first reflected optical wave with a second polarization.

20. The apparatus of claim 19, wherein the second polarization is orthogonal to the first polarization.

* * * * *